United States Patent
Sassenberg

(10) Patent No.: US 7,134,228 B2
(45) Date of Patent: Nov. 14, 2006

(54) TIME AND DATE MANAGEMENT APPARATUS

(76) Inventor: Hans Sassenberg, 13 Dow Rd., Bow, NH (US) 03304

( * ) Notice: Subject to any disclaimer, the term of this patent is extended or adjusted under 35 U.S.C. 154(b) by 0 days.

(21) Appl. No.: 11/189,578

(22) Filed: Jul. 26, 2005

(65) Prior Publication Data

US 2005/0268503 A1 Dec. 8, 2005

Related U.S. Application Data

(63) Continuation-in-part of application No. 10/405,395, filed on Apr. 3, 2003, now abandoned.

(51) Int. Cl.
*G09D 3/02* (2006.01)
(52) U.S. Cl. .......................... 40/122; 40/405
(58) Field of Classification Search ................. 40/122, 40/405; 283/2–4
See application file for complete search history.

(56) References Cited

U.S. PATENT DOCUMENTS

| | | | | |
|---|---|---|---|---|
| 1,601,119 A | * | 9/1926 | Heaton | .......................... 40/107 |
| 2,041,756 A | * | 5/1936 | Gray | .......................... 40/124.2 |
| 4,850,124 A | * | 7/1989 | Wilen | .......................... 40/122 |
| 5,015,319 A | * | 5/1991 | Wilen | .......................... 156/227 |
| 5,214,869 A | * | 6/1993 | Wilen | .......................... 40/122 |
| 5,263,523 A | * | 11/1993 | Scheunemann | .............. 150/132 |
| 5,412,886 A | * | 5/1995 | Quinn | .......................... 40/119 |

* cited by examiner

*Primary Examiner*—Cassandra Davis
(74) *Attorney, Agent, or Firm*—William B. Ritchi

(57) ABSTRACT

A sheet having indicia to indicate a one month time period and then with each month divided into days. Each sheet is provided with a slot that provides entry to a receptacle that is attached to the back of the sheet, thus keeping a portion of an inserted reminder card for an appointment or task remains easily visible for a user. General use appointment and task cards permit the user to tailor the time and date management apparatus to particular needs. Reminder cards could be color coded to indicate the type of task or appointment. Reminder cards can also be dimensioned to substantially the same size as a standard business card or appointment card such as used by a doctor or dentist.

5 Claims, 7 Drawing Sheets

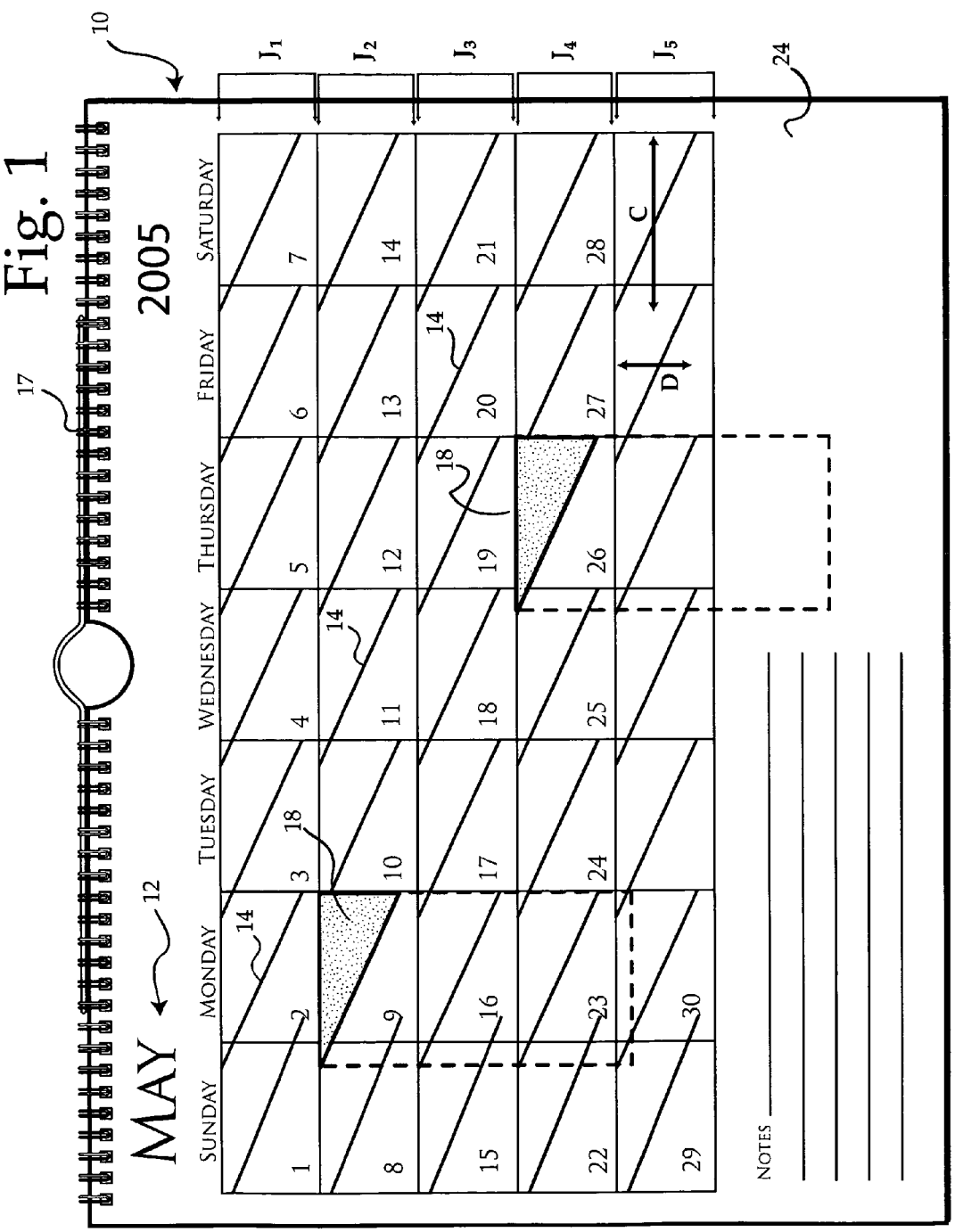

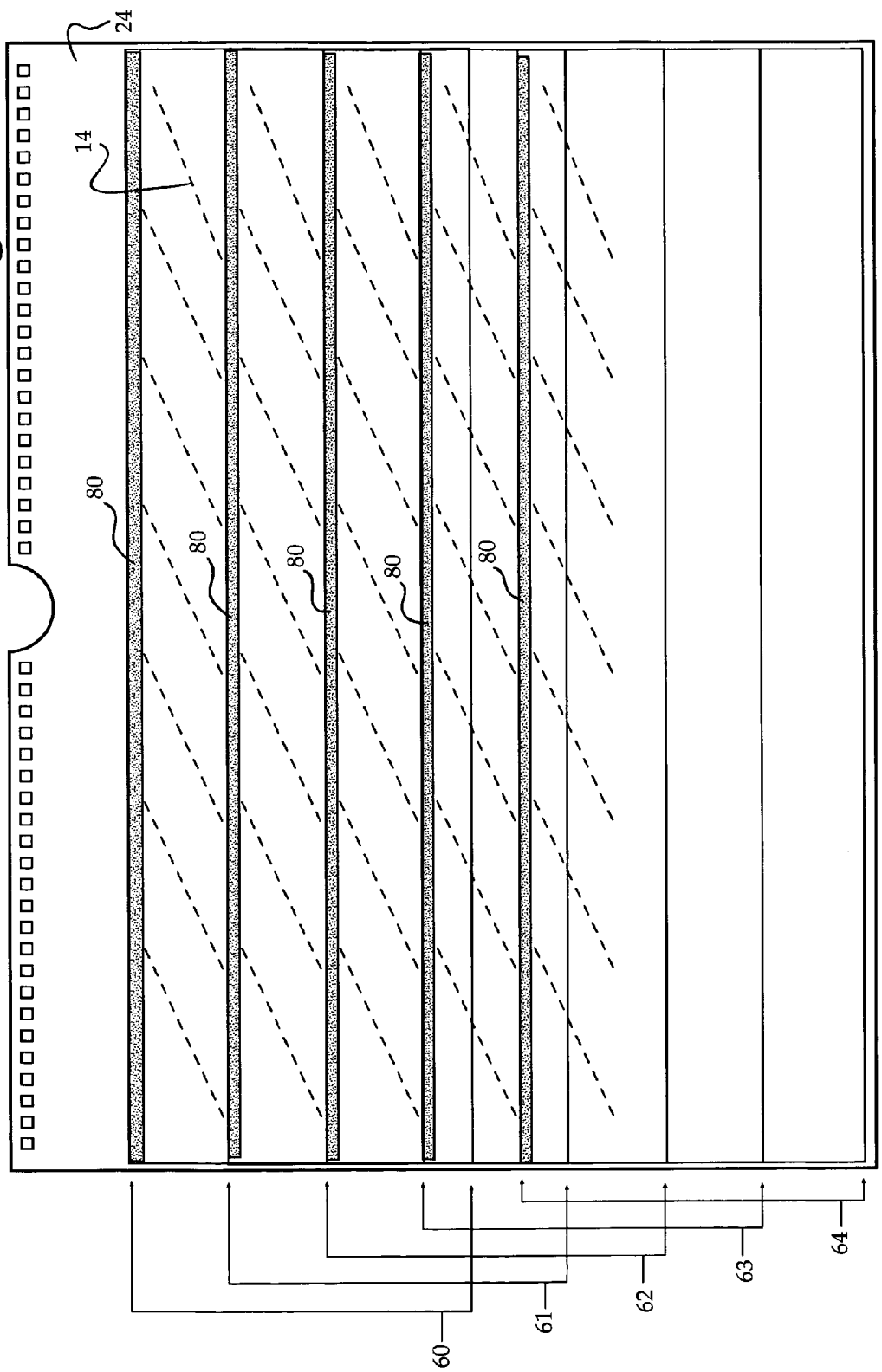

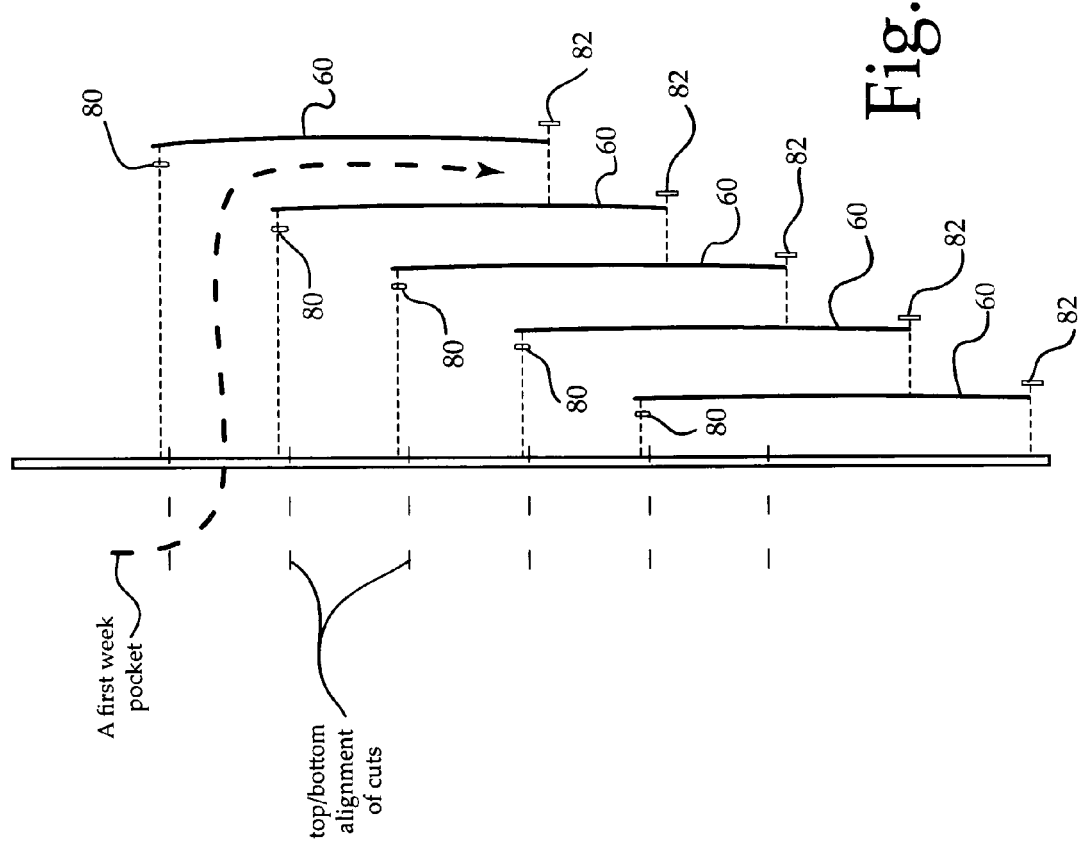

TIME AND DATE MANAGEMENT APPARATUS

This application is a continuation-in-part of U.S. Ser. No. 10/405,395, filed Apr. 3, 2003, now abandoned.

FIELD OF THE INVENTION

This invention relates to a time and date management apparatus, in particular a calendar to organize appointments and tasks.

BACKGROUND OF INVENTION

The use of calendars to manage time and appointments is well known in the art. The need for handling multiple tasks and appointments is found in many different types of situations. Situations where people face numerous appointments are thus difficult to manage. Examples of such situations that are difficult to manage are found in sales workplaces requiring multiple client visits and in a home where a person must self-administer many different types of medications.

Typical calendars fall into three general categories: preprinted paper, dry-erase boards, and computer software. The first two require a person to manually transcribe with pen or pencil the appointments and tasks onto a surface area, while the third type requires a computer for use and enjoyment.

The problem with manually transcribing information on a preprinted paper calendar is that the information often times will not fit within the finite space provided by a calendar. Additionally, with preprinted paper calendars when appointments and tasks are rescheduled or recurring they must be written out once again. Finally, with preprinted paper calendars, a person runs the risk of overlooking appointments or tasks once the information in the portioned area becomes too voluminous.

Like preprinted paper calendars, the second category, dry-erase boards, present some of the same limitations, especially as problems relate to a finite area of space within which to record information. Admittedly, one improvement of dry-erase boards over preprinted paper calendars is that a person can remove and re-record information faster than with a preprinted paper calendar. Nonetheless dry-erase boards still require rescheduled or recurring appointments or tasks are written out one at a time. Finally, dry-erase boards present two problems unique from preprinted paper calendars. First, ink on a dry erase board will often times smudge, contributing to confusion. Second, when ink on dry-erase boards is erased a bothersome residue is often left behind, potentially damaging clothing or at the very least presenting a nuisance by amassing on a person's skin.

The third general category of calendars, computer software, offers some distinct improvements over earlier preprinted paper and dry-erase boards. Much more information can be stored within a certain space on a computer software calendar, displays can be manipulated according to the preference of the user, and recurring appointments are recorded with relative ease. However, computer software calendars are limited in two areas: the overall monthly or yearly view of the calendar is constrained by the size of the computer's monitor, and the use and enjoyment of the computer software calendar requires that the user has already made a costly economic investment—the purchase of a computer.

A calendar that is designed to hold standard business cards or pre-printed appointment cards in a pocket corresponding to the due date is not found in the prior art.

SUMMARY OF THE INVENTION

It is an aspect of the invention to provide receptacles behind each day on the calendar within which reminder cards are placed for important appointments and tasks.

The invention also provides that the receptacles be sized in a manner conducive to storing business cards.

The invention allows a portion of the reminder and business cards to protrude so that their presence in the calendar on a particular day is known.

It is another aspect of the invention to provide slots for placing the cards extend slightly into an adjacent day so that the calendar can be a width that is typical of a traditional calendar.

Still another aspect of the invention is to provide slots in the calendar that are diagonal rather than horizontal to eliminate the possible of tearing the calendar during the insertion and removal process of a card.

Another aspect of the invention is to provide pockets for the cards that use anti-static PVC (polyvinylchloride) transparent plastic. The advantage of using transparent plastic is the back of the cards can be read without necessarily removing them from their pockets if information is contained thereon.

Still another aspect of the invention is to provide pockets that are taped together to form a monthly array rather than heat sealing the plastic strips which would cause plastic pockets to curl, ripple and otherwise distort the calendar shape.

The invention is designed so that the receptacles are compartmentalized but attached to one another allowing for them to be bonded and thus fastened to the back of each sheet of the apparatus.

Each sheet preferably has indicia to indicate a one month time period and then with each month divided into days. However, the time duration could be one day and then each month divided into hours. Other arrangements could also be used such as the seasons, years, and so on. Each sheet is provided with a slot that provides entry to a receptacle that is attached to the back of the sheet. However, the receptacle could be eliminated if each reminder card was die cut stamped so that a tab was placed in the card. The tab could then be placed on edge of the slot to align and position the reminder card so that the appointment time, place, etc. could be easily viewed.

Finally the invention includes general use appointment and task cards that the user can tailor to his or her particular needs. For example, the reminder cards could be color coded to indicate the type of task or appointment. Reminder cards can also be dimensioned to substantially the same size as a standard business card or appointment card such as used by a doctor or dentist.

These and other aspects of the invention will become apparent in light of the detailed description of the invention which follows.

BRIEF DESCRIPTION OF THE DRAWINGS

FIG. 1 is a front view of time and date management apparatus in accordance with the invention.

FIG. 2a is a rear view of the apparatus showing "pocket" strips attached with double side cellophane tape.

FIG. 5 is an exploded view of the pocket construction that is provided on the back of the apparatus.

DETAILED DESCRIPTION OF THE INVENTION

Figure 2B:
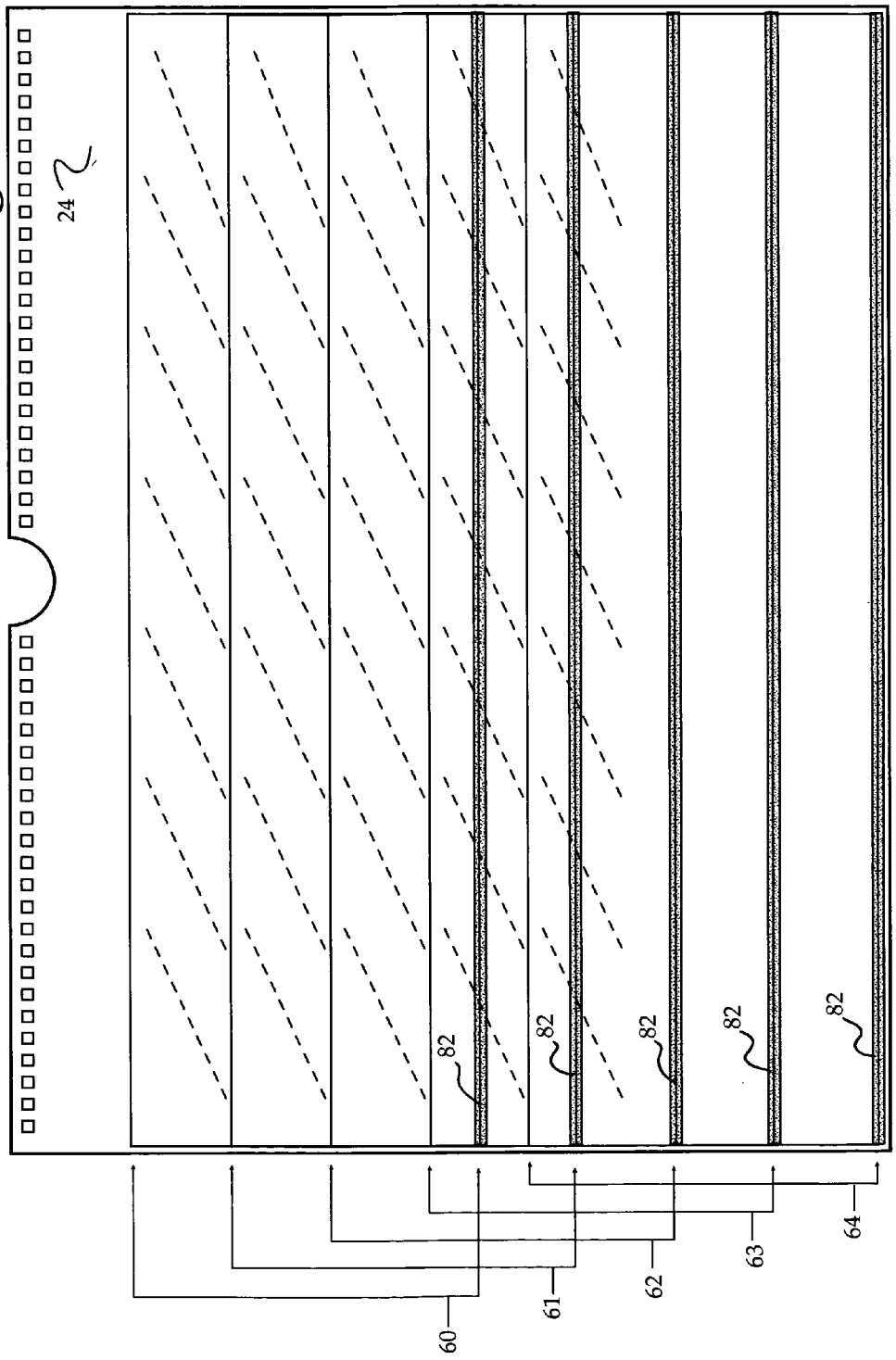
FIG. 2b is a rear view of the apparatus showing "pocket" strips attached with single sided cellophane tape.

The invention is a time and date management apparatus preferably having twelve monthly sheets and various reminder cards allowing the user to distribute various appointments and tasks throughout the calendar in an efficient manner. This level of efficiency is desirable in situations where there are a multitude of appointments and tasks faced by the user.

As noted above, a different time duration (not shown) well known in the art could be selected. For example, each sheet could represent a time duration of one week, one day, etc. Time intervals would then be then days, hours, etc.

Referring first to FIG. 1, invention 10 is a sheet preferably made from heavy-stock paper 10 that serves as the back page of the apparatus which is typically a monthly calendar . . . The front side of the sheet 24 is imprinted with the indicia 12 depicting time duration and time interval. As shown, the time duration is the month of May, 2005 and the time interval are the days of the month. Each week makes up one row with the days of the week forming the headers and the month and year displayed across the top. Each day is bordered within a box that has sufficient room for additional indicia 20 to be placed thereon, either handwritten or printed. Each day contains a slot 14 within which a standard business card 18 is placed so that a portion is above slot 14 and is visible. The remainder of card 18 is behind sheet 24 and therefore not visible. Alternatively card 18 may also be color coded 22 which is discussed below or imprinted with special appointment information. The width C of slot 14 is dimensioned in accordance with the short axis (2 inches) of card 18. Note that width of slot 14 extends slightly into an adjacent day. This is done so that the overall width of calendar is comparable to typical prior art calendars. Also, each slot 14 is set at an approximately 30 degree angle (depending on the row which is discussed below). This angle helps eliminate potential weakness and tearing that could occur between adjacent slots.

Also, the height D of slot 14 is dimensioned so that more than one card 18 may be introduced into each slot 14.

As noted, the layout of sheet 24, while preferable, can easily be changed to accommodate different time durations and time intervals. Further, indicia 12 can be imprinted using any calendar layout including decorative material well known in the art.

The pages of the calendar are hinged together to the heavy stock paper 10 via spiral binder 17. However, any well known technique used to hold one calendar page to another could be substituted.

Turning to FIGS. 2a, 2b, and 5, the construction of the calendar page pockets are shown. Five horizontal strips of non-static PVC (polyvinylchloride) plastic are overlapped to form the pockets to hold the portion of the cards that are hidden behind the calendar page. Each strip 60, 61, 62, 63, 64 is preferable 3⅝ inches wide and 13 inches long. By selection strips of these dimensions, the calendar is comparable in size to standard wall calendars yet will accommodate standard 2 by 3½ inch business cards.

The extra ⅛ inches width in each strip allows for a ⅛ inch cellophane adhesive tape for fastening. The pocket construction preferably uses cellophane adhesive tape such as manufactured under the SCOTH brand by 3M Corp. The inventor has discovered that heat sealing the layers together results in the calendar pages to curl, ripple and thus the calendar can distort substantially.

Further, PVC transparent sheets are preferable because other plastic products as well as vellum, tissue paper, wax paper, cotton fiber paper causes the pages to puff up, billow, wave and wrinkle. The non-static nature of the PVC sheets eliminates dust, dirt and hair from adhering to the strips and ensures a clean pocket.

As shown in FIGS. 2a and 5, strip 60 is fastened to the sheet 24 with double-sided tape 80 at the top of weekly row j1. Sheet 60 is on top taped to sheet 24 with tape 80, sheet 61 is taped underneath sheet 60 with tape 80, offset by the width of the weekly row j1; sheet 62 is taped underneath sheets 61 and 60 with tape 80, offset by the width of weekly row j2 and so on.

As shown in FIGS. 2b and 5, the bottom of strip 60 is fastened to strip 61 with single-side cellophane tape 82; the bottom of strip 61 is fastened to strip 62 with tape 82; the bottom of strip 63 is fastened to strip 64 and the bottom of strip 64 is fastened to sheet 24 with tape 82. Thus five discrete horizontal rows are provided, each row is accessed the row of slots 14 corresponding to the day of the week and date within the calendar month. The "pocket" has no sides but cards are kept vertically in place by alignment with the bottom of the taped row and diagonal slot that is used to insert the card.

Figure 3:
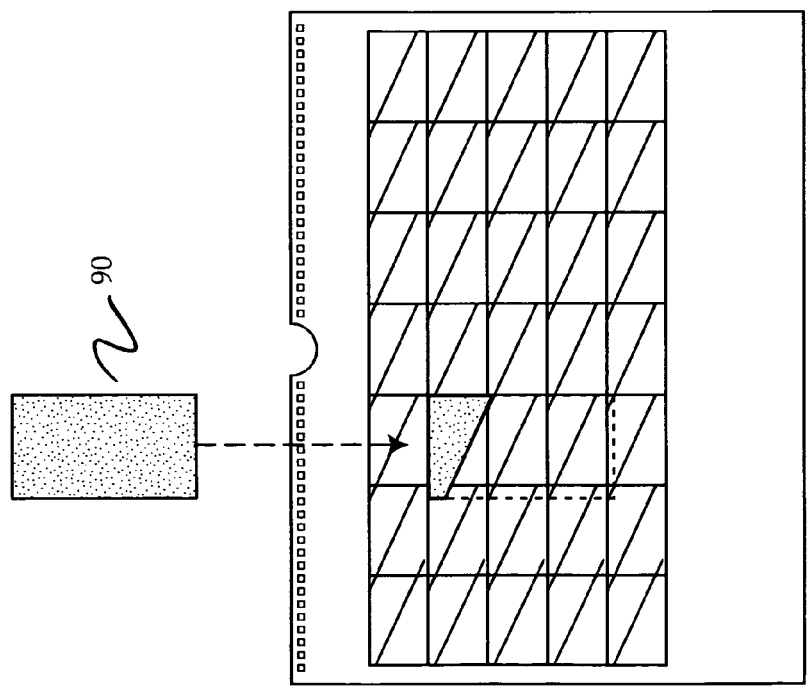
FIG. 3 is a front view of a business card being inserted into a pocket.

FIG. 3 is a front view of a business card 90 being inserted into a "pocket". The portion of card 90 that is visible from the front is shown shaded. The area held behind sheet 24 is shown in dotted line.

Noted that a small portion of card 90 extend over into the indicia for the preceding day. At noted above, this enables seven (7) columns of two inch wide business cards plus calendar borders to be fit into a width that is about 13 inches wide. As noted above, the slots 14 are at a slightly different angle for the first columns that the remaining columns, again to save achieve a narrower calendar.

Figure 4:
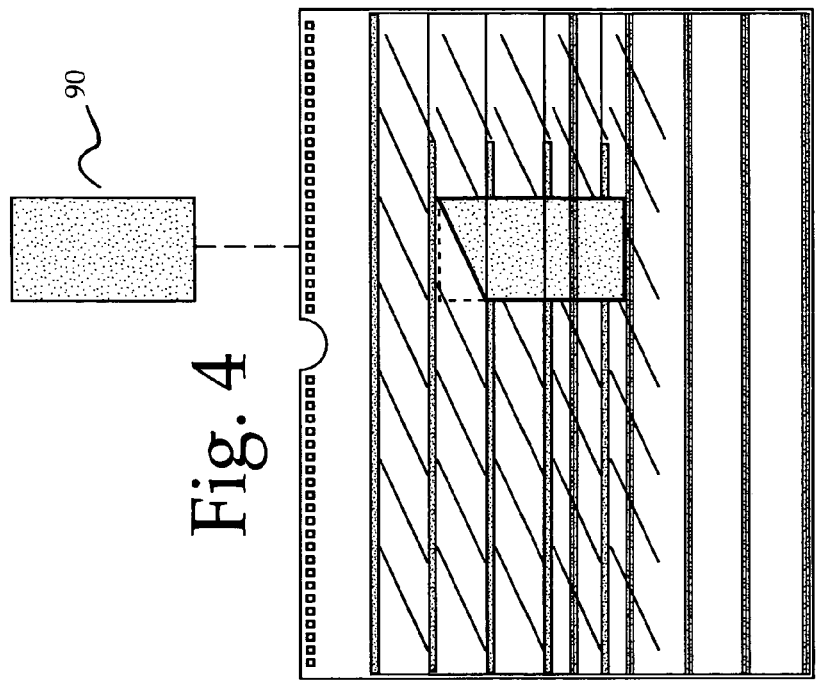
FIG. 4 is a rear view of the business shown in FIG. 3 in its pocket.

FIG. 4 is a view of the business card 90 shown in FIG. 3 in the same "pocket" as viewed from the rear. Note that the bottom of the card is held from slipping by the taped sealed bottom of the strip.

Figure 6:
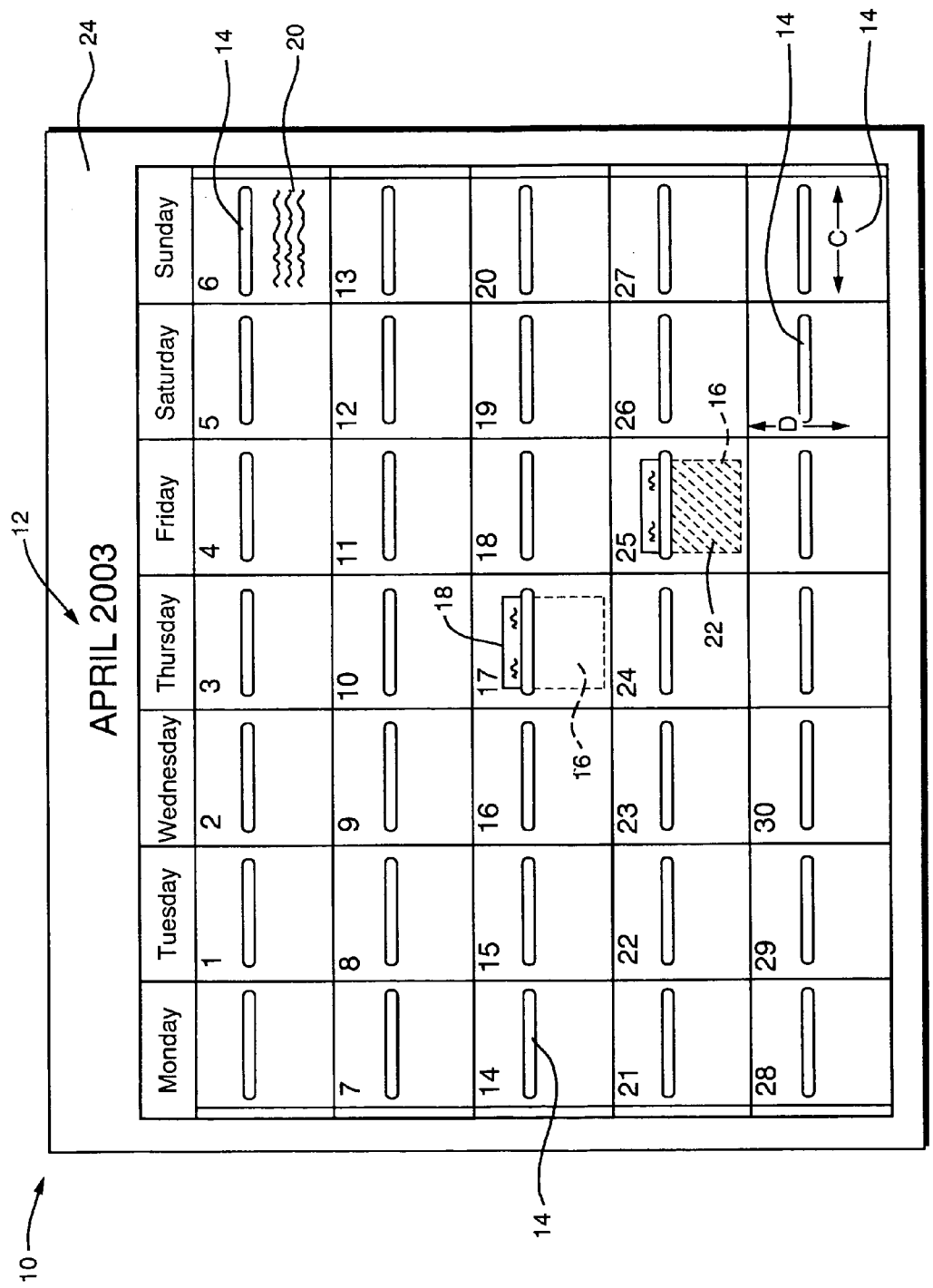
FIG. 6 is an alternative embodiment of the invention.

FIG. 6 shows an alternative embodiment of the invention with the slots 14 being horizontal. In this configuration, the width of the calendar must be at least 16 inches, not including borders, to accommodate the use of standard business cards. The pockets could also be constructed as previously described in U.S. pat. Ser. No. 10/405,395, filed Apr. 4, 2003, now abandoned, and hereby incorporated herein in its entirety.

As previously, each sheet 24 of invention preferably contains separate plastic receptacles for standard business cards or reminder cards 18 (discussed below) that can be placed in each time interval, usually a calendar day. The receptacles are preferably plastic sheets which dimensioned in accordance with the size of the reminder card 18 or standard business card that are to be held within. Each receptacle should be able to hold at least two reminder cards 18 or paper slips or a combination of both to remind the user of an appointment that is due during the time interval represented the corresponding receptacle. The total amount of information thus contained in each day is considerably more than can be stored on a similarly sized calendar that requires manual transcribing information. Using only business cards as an example, key contact information for meetings is all contained within the day.

The plastic receptacles are grouped in horizontal rows where each receptacle forms a row as previously shown. Each receptacle is positioned such that a portion or reminder card 18 or standard business card is clearly visible and held at that desired height. The remaining portion of reminder card 18 is held in the back of sheet 24 within receptacle and out of view. Each row can be cascaded. At least a portion of the each row may be overlapped with an adjacent row so that the overall top to bottom dimension of sheet 24 can be less than if each receptacle abutted each receptacle below it.

As noted, sheets are preferably plastic so that they can be heat sealed to form receptacles as an alternative to preferable taping. However, paper that is glued together could also be used if the limitations of this method are recognized. The sheets can be attached together via heat sealing to form "pockets" and are attached to sheet 24. Also, the sides could be heat sealed as well so that each row of "pockets" form seven distinct pockets if that was desired.

Figure 8:
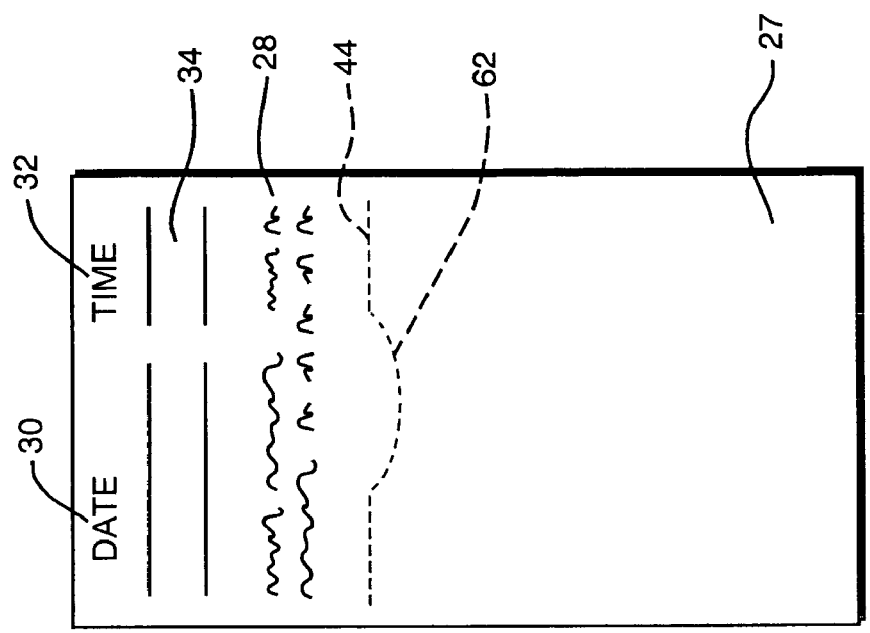
FIG. 8 is another alternative embodiment of a specifically designed reminder for the apparatus.
Figure 7:
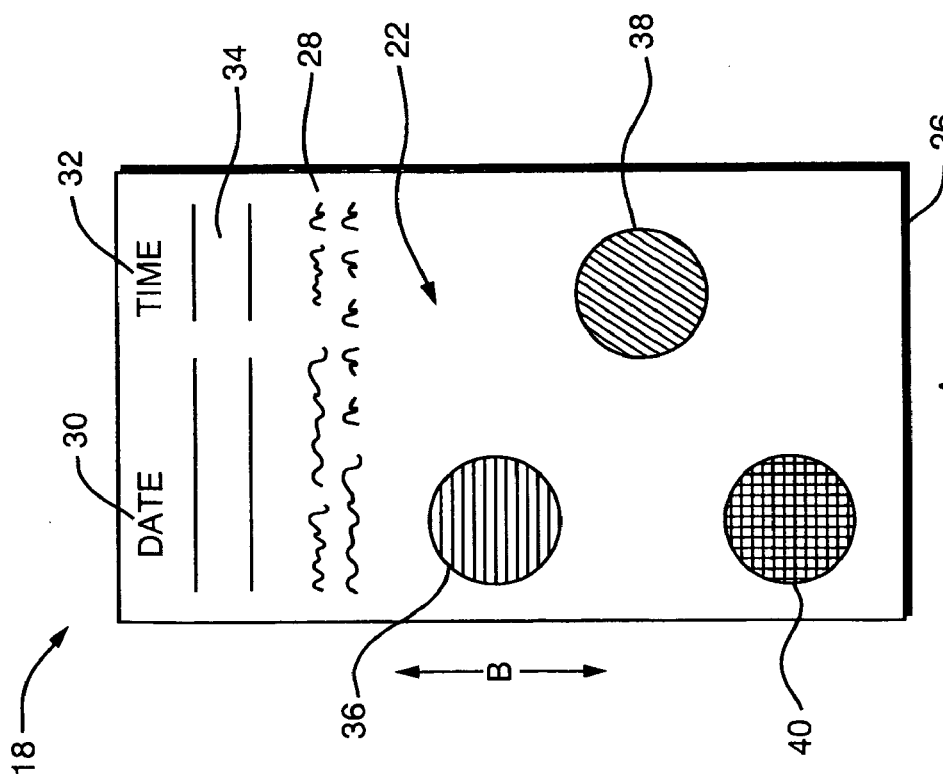
FIG. 7 is an alternative embodiment of a specifically designed reminder card for the apparatus.

As shown in FIGS. 7 and 8, reminder cards 18 can be colored coded 22. Thus, for example, as shown, reminder card 18 could be blue 36 to indicate a doctor's appointment, green 38 to indicate music lessons, and gold 40 to indicate a social engagement. Since reminder cards 18 are sized in accordance with standard business card sizes, invention 10 can be used with reminder cards 18 packaged with invention 10 or in combination with standard business and appointment reminder cards.

As shown in FIGS. 7 and 8, alternative embodiments of reminder card 18 are shown. In this embodiment, die cut 44 is made into reminder card 18 so that a tab 62 is provided. Tab 62 hold reminder card 18 in position on slot 14 so that positioning sheet 51 with receptacles 46 is unnecessary. However, this embodiment is limited to the use of special cards having tab 62 die cut therein since the use of a standard business card will merely slide though slot 14 and not be held within position to be viewed.

The invention allows the user to shuffle and reschedule appointments as needed by simply removing cards and placing them within another receptacle. As mentioned this requires considerably less effort than crossing out or erasing unfulfilled tasks and canceled or rescheduled appointments and manually transcribing the same information all over again.

While certain representative embodiments of the invention have been described herein for the purposes of illustration, it will be apparent to those skilled in the art that modification therein may be made without departure from the spirit and scope of the invention.

What is claimed is:

1. A time and date management calendar apparatus for handling a plurality of appointment or tasks, said system comprising: a sheet for each month each sheet having a front and a back wherein the front of said sheet is imprinted with the days of the month and divided into weekly rows of the month, a plurality of die cut diagonal slots cut into each sheet, with each slot corresponding to a particular day of the week and wherein a small portion of each slot extends to an adjacent day of the same week;

a plurality of translucent PVC overlapping strips attached to said sheet with double-sided tape at a top edge of each of said strips, wherein each strip corresponds to one of the week rows and is offset corresponding to the width of the weekly rows imprinted on said sheet and further attached at bottom edge of the strip to an adjacent overlapping strip or the sheet using single-sided tape to form "pocket" rows corresponding the weekly rows such that at least one standard business card may be placed in each "pocket" by inserting the card through the slot corresponding to that day thus serving as reminder to a user.

2. The calendar apparatus of claim 1 further comprising pre-printed reminder card which correspond in size to standard business cards.

3. The calendar apparatus of claim 2 wherein said pre-printed reminder cards are color coded in accordance with a specific appointment or task.

4. The calendar apparatus of claim 2 wherein said pre-printed reminder cards have indicia that correspond to specific appointments or tasks.

5. The calendar apparatus of claim 1 wherein said sheets with their attached "pockets" are fastened along one edge such that each of said plurality can be viewed one month at time by flipping top sheet over to reveal the monthly sheet immediately underneath.

\* \* \* \* \*